US009335763B2

(12) United States Patent
Nagashima

(10) Patent No.: US 9,335,763 B2
(45) Date of Patent: May 10, 2016

(54) CONTROL SYSTEM INSTALLED IN AIRCRAFT, COMPUTER READABLE STORAGE MEDIUM AND AIRCRAFT

(71) Applicant: MITSUBISHI AIRCRAFT CORPORATION, Aichi (JP)

(72) Inventor: Yoshihiro Nagashima, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 193 days.

(21) Appl. No.: 14/453,675

(22) Filed: Aug. 7, 2014

(65) Prior Publication Data

US 2015/0253769 A1    Sep. 10, 2015

(30) Foreign Application Priority Data

Aug. 22, 2013  (JP) ................................. 2013-172065

(51) Int. Cl.
| | |
|---|---|
| G05B 23/02 | (2006.01) |
| G05B 19/042 | (2006.01) |
| F02C 9/00 | (2006.01) |
| F02C 9/28 | (2006.01) |
| F02C 9/48 | (2006.01) |

(52) U.S. Cl.
CPC .............. *G05B 23/0272* (2013.01); *F02C 9/00* (2013.01); *F02C 9/28* (2013.01); *F02C 9/48* (2013.01); *G05B 19/0428* (2013.01); *F05D 2220/323* (2013.01); *F05D 2260/80* (2013.01); *G05B 2219/34072* (2013.01)

(58) Field of Classification Search
CPC ....................... G05B 23/0259; F05D 2220/323
See application file for complete search history.

(56) References Cited

U.S. PATENT DOCUMENTS

| | | | | |
|---|---|---|---|---|
| 4,667,176 A | * | 5/1987 | Matsuda .................. | B60Q 9/00 340/459 |
| 2011/0288836 A1 | | 11/2011 | Lacaille et al. | |
| 2012/0101706 A1 | * | 4/2012 | Masse ....................... | F02C 9/00 701/100 |
| 2013/0274949 A1 | * | 10/2013 | Farnsworth ........... | G01M 17/00 701/1 |
| 2013/0332010 A1 | * | 12/2013 | Ziarno ............... | G05B 23/0213 701/3 |
| 2013/0332011 A1 | * | 12/2013 | Ziarno ............... | G05B 23/0213 701/3 |
| 2013/0332025 A1 | * | 12/2013 | Ziarno ............... | G05B 23/0213 701/33.4 |
| 2014/0005856 A1 | * | 1/2014 | Farnsworth ............ | G05B 11/01 701/1 |

FOREIGN PATENT DOCUMENTS

JP         2012-510585 A       5/2010

* cited by examiner

*Primary Examiner* — McDieunel Marc
*Assistant Examiner* — James E Stroud
(74) *Attorney, Agent, or Firm* — Pearne & Gordon LLP

(57) ABSTRACT

To improve the reliability of a control in a control system for devices included in an aircraft, such as engines. An engine control system 10 for controlling engines 11 of an aircraft includes a FADEC 30 including a calculation processing unit 33 for performing control calculation, and a first memory 321 for storing abnormality detection information that indicates that the calculation processing unit 33 detects an abnormality occurred in a sensor 20 and an actuator 21 used for a control. The abnormality detection information is not erased but still stored in the first memory 321 since the first memory 321 is not cleared even if the engine 11 is stopped. As a result, referring to the abnormality detection information makes it possible to avoid using a device having a low reliability, in which an abnormality is detected, for the control.

7 Claims, 3 Drawing Sheets

CONTROL SYSTEM INSTALLED IN AIRCRAFT, COMPUTER READABLE STORAGE MEDIUM AND AIRCRAFT

BACKGROUND OF THE INVENTION

1. Field of the Invention

The present invention relates to a control system for controlling, for example, an engine of an aircraft, and to a computer program.

2. Description of the Related Art

Engines of aircrafts are controlled by a control computer called FADEC (Full Authority Digital Engine Control).

The FADEC controls engines so as to obtain optimal performances in terms of safety and fuel efficiency.

The FADEC performs calculation based on a stored program, using detection signals received from a variety of sensors, and issues instructions to effect the operation of the engines or peripheral devices. Meanwhile, the FADEC detects an abnormality in a sensor included in a control system if it occurs. The method of detecting abnormalities is described in, for example, International Patent Application, Japanese Publication No. 2012-510585.

Upon detecting an abnormality in a sensor, the FADEC writes an abnormality detection flag indicating the abnormality detected in the sensor, to a memory. Referring to this flag makes it possible to avoid using detection signals from the sensor in which the abnormality is detected, for the control.

However, when the engines are stopped, the conventional FADEC erases all the content in the memory except for the program. At this time, the abnormality detection flag is also erased. In addition, the abnormality detection information is also erased in the case where a power source of the FADEC is turned off and the energization to the memory is shut off.

The abnormality flag is thus not utilized for improving the reliability of the control.

The present invention has an object to improve the reliability of a control in a control system for a device included in an aircraft, such as an engine.

SUMMARY OF THE INVENTION

A control system of the present invention for controlling an engine of an aircraft includes a control computer that includes a calculation processing unit for performing control calculation, and a storage for storing abnormality detection information that indicates a detected abnormality in a device used for an engine control, the abnormality being detected by the calculation processing unit, and the abnormality detection information is not erased but still stored in the storage even if the engine is stopped.

The abnormality detection information can be still stored in the storage by a program executed by the control computer included in the control system.

In the present invention, since the abnormality detection information is still stored in the storage even if the engine is stopped, referring to the abnormality detection information makes it possible to avoid using a device having a low reliability in which the abnormality is detected, for the control. The engine can be then controlled with only devices in which no abnormality is detected, which in turn allows for improving the reliability of controlling the engine.

In the control system of the present invention, it is preferable that the storage has volatility, and the abnormality detection information is not erased but stored in the storage even if the engine is stopped as long as a power source of the control computer is on.

In the present invention, stored content is not cleared and the abnormality detection information is stored in the storage even if the storage is not nonvolatile, as long as the power source of the control computer is on when the engine is stopped.

As a result, the device in which any abnormality has been detected until the last operation of the engine finished can be grasped on the basis of the abnormality detection information, without waiting for the abnormality to be detected again after the engine is started the next time. The engine can be then controlled using only devices in which no abnormality is detected.

In the control system of the present invention, it is preferable that the storage has nonvolatility, and the abnormality detection information is not erased but still stored even if the power source of the control computer is turned off and the energization to the storage is shut off.

Thereby, after the power source of the control computer is turned on to start, a device in which an abnormality has been detected until the computer finished operating the last time can be grasped on the basis of the abnormality detection information, without waiting for the abnormality to be detected again after the computer starts the next time. The engine can be then controlled using only devices in which no abnormality is detected.

Although the device in which the abnormality is detected can be repaired or changed on the basis of the abnormality detection information, there is the case where the device is hard to maintain while the power source of the control computer is on.

In this case, it is useful for the improvement of the reliability of the control to use a nonvolatile storage, and to take over, at the time when the power source of the control computer is turned on, the abnormality detection information on the device in which the abnormality had been detected before the computer finished operating the last time.

In the control system of the present invention, it may be configured to include a sensor and an actuator as the aforementioned device used for the engine control, and a detection signal of the sensor is used for the control calculation, and the actuator is operated on the basis of the results of control calculation. In this case, abnormality detection information on at least one of the sensor and the actuator is stored in the storage.

The control system of the present invention may apply to a control object other than an engine of an aircraft. Also in this case, the control object can be controlled with only devices in which no abnormality is detected, enables to improve the reliability of controlling.

Further, the present invention provides a computer readable storage medium storing a computer program. The computer program is used for controlling an engine of an aircraft, wherein a calculation processing unit for performing control calculation based on the computer program causes the aforementioned abnormality detection information to be still stored in a storage without being erased even if the engine is stopped.

According to this computer program, since the abnormality detection information is still stored in the storage even if the engine is stopped, referring to the abnormality detection information makes it possible to avoid using a device having a low reliability, in which any abnormality has been detected, for the control. The engine can be then controlled with only devices in which no abnormality is detected, which in turn allows for improving the reliability of controlling the engine.

According to the present invention, it is possible to improve the reliability of the control system installed in the aircraft.

DETAILED DESCRIPTION OF THE PREFERRED EMBODIMENT

The embodiments according to the present invention will be described below with reference to the drawings.

First Embodiment

Figure 1:
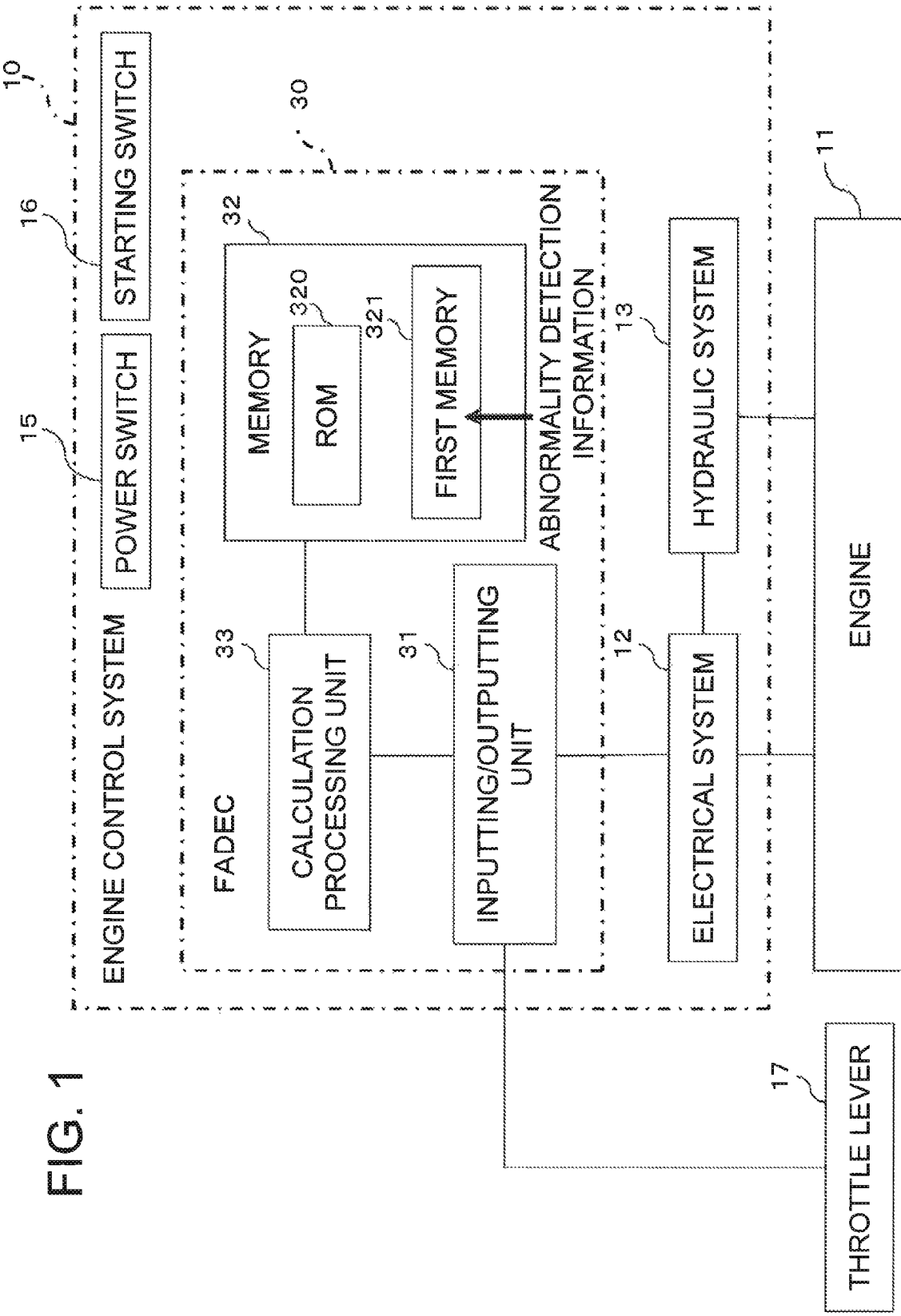
FIG. 1 is a block diagram showing a schematic configuration of a FADEC installed in an aircraft according to a first embodiment of the present invention.

An engine control system 10 shown in FIG. 1 is used for controlling engine 11 of an aircraft.

The engine control system 10 includes an electrical system 12 and a hydraulic system 13, and a FADEC 30 being a control computer for electrically controlling the engine 11 via the electrical system 12 and the hydraulic system 13.

The FADEC 30 has operation modes for the engine 11 such as start, acceleration, stationary, deceleration, and stop, and when a pilot handles a throttle lever 17 for the engine 11 to select the operation mode, controls the engine 11 so as to obtain optimum performances in terms of safety and fuel efficiency.

The FADEC 30 is configured to control each of multiple the engines 11 included in the aircraft.

The FADEC 30 is started when the power source thereof is turned on, on its flight. Turing on the power source can be made by the operation of a power switch 15 or the like. Turning on the power source of the FADEC 30 causes parts of the engine control system 10 to activate.

Each of the engines 11 is started by the operation of a starting switch 16 connected to the FADEC 30. The FADEC 30 operates until the end of the flight while controlling the engines 11. When the power source of the FADEC 30 is turned off, operation of the entire engine control system 10 is stopped.

The FADEC 30 controls an ignition device (not shown) and a fuel controller (not shown) as peripheral devices of the engines 11. These devices and the engines 11 are operated by the electrical system 12 and the hydraulic system 13.

The electrical system 12 includes a variety of sensors and a variety of actuators.

The hydraulic system 13 also includes a variety of actuators and a variety of sensors.

These sensors and actuators are selectively used depending on the operating status of the engines 11.

Figure 2:
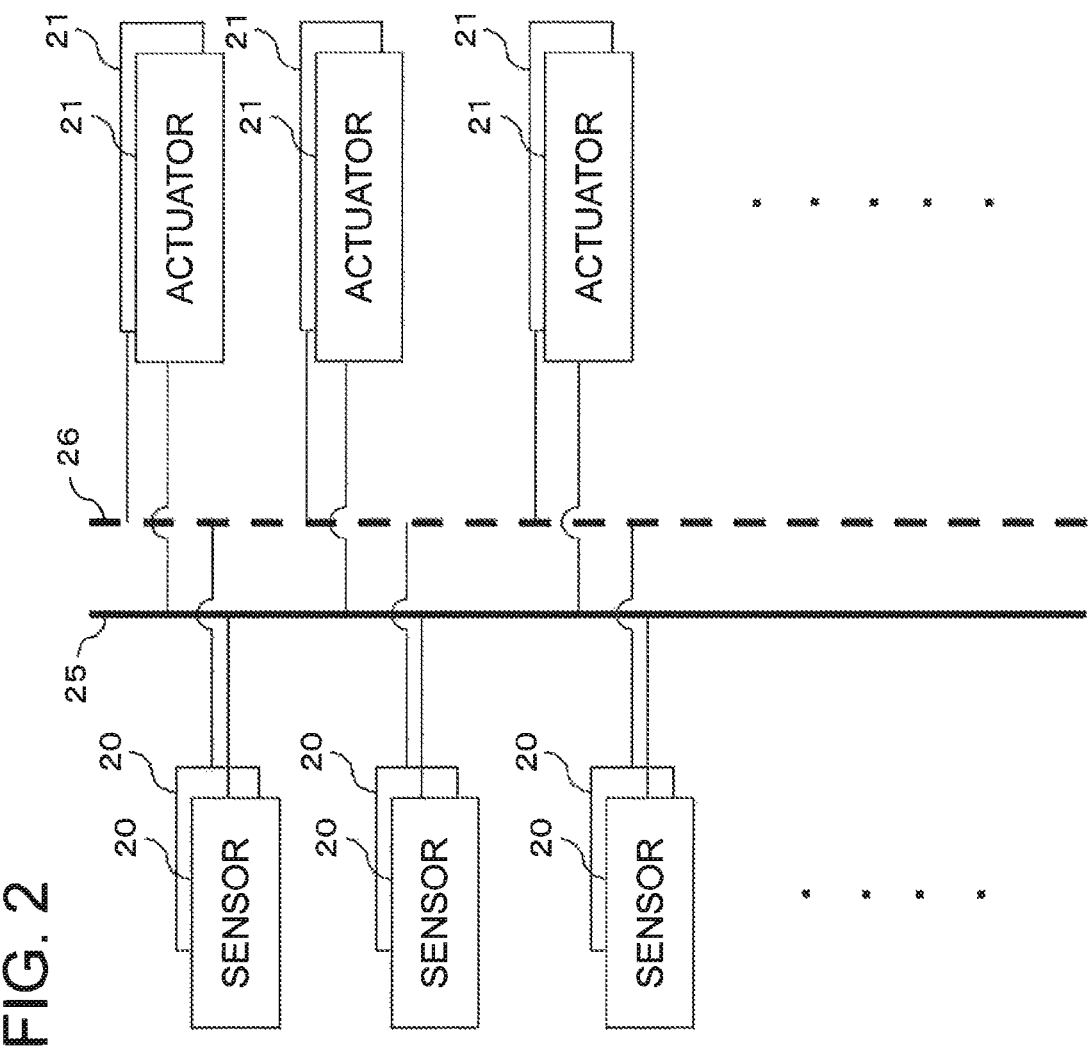
FIG. 2 is a schematic diagram showing sensors and actuators included in the FADEC.

A variety of sensors 20 and actuators 21 belong to the electrical system 12 or the hydraulic system 13 are shown in FIG. 2. Each of the electrical system 12 and the hydraulic system 13 includes a first system 25 and a second system 26, which are the same two systems, in a duplex manner so as to have redundancy, and the sensors 20 and the actuators 21 are provided in each of the first system 25 and the second system 26.

Each of the first system 25 and the second system 26 are provided with a sensor 20 for detecting the number of revolution of the engine 11, a sensor 20 for detecting the temperatures of parts of the engine 11, a sensor 20 for detecting the degree of opening of fuel measuring valve, and the like.

In addition, each of the first system 25 and the second system 26 are also provided with an actuator 21 for opening/closing the fuel measuring valve of the engine 11, an actuator 21 for driving a stator vane of the engine 11, and the like.

The above-described sensors 20 and the actuators 21 are merely one example, and there are a large number of sensors 20 and actuators 21.

The sensors 20 included in the respective first system 25 and second system 26 have the same structure and function, and can be replaced with each other if they are both normal. These two sensors 20 are given different IDs (Identifiers).

The detection signals from one or both of the two sensors 20 are obtained by the FADEC 30 and used for the control calculation.

In addition, The actuators 21 included in the respective first system 25 and second system 26 also have the same structure and function, and can be replaced with each other if they are both normal. These two actuators 21 are also given different IDs (Identifiers).

One of the two actuators 21 operates on the basis of calculation results by the FADEC 30.

The FADEC 30 includes an inputting/outputting unit 31, a memory 32 for storing data, and a calculation processing unit 33 configured by a CPU (Central Processing Unit), etc. and is called ECU (Engine Control Unit).

The FADEC 30 further includes an outputting device for outputting signal to display the control status, operation mode, and operation command of the engines 11, an inputting device for selecting an operation command. The illustrations of these outputting device and inputting device are omitted.

The inputting/outputting unit 31 communicates with a core system (not shown) for controlling the operation or the flight of the aircraft. In addition, the inputting/outputting unit 31 receives detection signals from the sensors 20, or position signals of the throttle lever 17, and outputs control signals to driving circuit for the actuators 21.

The memory 32 includes a first memory 321 being a volatile storage such as RAM (Random Access Memory), and a ROM 320 being a nonvolatile storage such as an EEPROM (Electrically Erasable Programmable Read-Only Memory).

The first memory 321 stores a computer program (hereafter, referred to as program) being engine control software read from the ROM 320, data used in the program, and values of sensor 20 used for the calculation.

The first memory 321 typically stores the data only while being energized. The first memory 321 stores the program that is read from ROM 320 when the FADEC 30 is started, the calculated values calculated as a result of running the program, as well as abnormality detection information indicating that abnormality is detected in the sensor 20, the actuator 21, etc.

In contrast, the ROM 320, being nonvolatile, still stores the data, even after the power source of the FADEC 30 is turned off and the energization thereto is shut off.

The ROM 320 stores data necessary for initializing the FADEC 30 on starting up, the program, and the like before shipment.

The calculation processing unit 33 operates based on the program.

The calculation processing unit 33 performs the calculation on the basis of, for example, an engine operating state notified from the core system, detection signals from the sensors 20 of the electrical system 12, detection signals from the sensor 20 of the hydraulic system 13 through the electrical system 12, and position signals of the throttle lever 17 and the like. The calculation processing unit 33 then outputs, on the basis of the calculation result, control signals to effect the operation of the variety of actuators 21 of the electrical system 12 and the hydraulic system 13. The control signals are transmitted to an actuator driving circuit, which drives the actuators 21. The actuator driving circuit is provided in the electrical system 12 or the FADEC 30.

In this way, the calculation processing unit 33 performs the calculation using the detection signals from the sensors 20, and outputs, on the basis of the calculation result, the control signal to operate the actuators 21.

Based on the program, the calculation processing unit 33 detects an abnormality in the sensor 20 or the actuator 21 due to a failure.

Upon detecting an abnormality in the sensor 20 or the actuator 21, the calculation processing unit 33 outputs signals to display a message, as needed.

The calculation processing unit 33 then causes the first memory 321 to store abnormality detection information on the sensor 20 or the actuator 21 in which the abnormality is detected.

The abnormality detection information is configured in association with the sensor 20 or the actuator 21 in which the abnormality is detected so as to identify the sensor 20 or the actuator 21. The abnormality detection information of the present embodiment contains the ID of the sensor 20 or the actuator 21 in which the abnormality is detected. In addition to the ID, a date and time at which the abnormality is detected may be contained. The abnormality detection information can be optionally configured.

A method with which the calculation processing unit 33 detects an abnormality in the sensor 20 and the actuator 21 is optional. For example, with respect to data on outside air temperatures, assume that the average value of values detected from a plurality of outside air temperature sensors provided on an airframe is being calculated. In such a case, if the detected value of one sensor among the plurality of outside air temperature sensors exceeds a threshold value with respect to a detected value of other sensors, the sensor with the detected value exceeding the threshold value can be considered to be anomalous.

The calculation processing unit 33 causes the first memory 321 to store the abnormality detection information every time the abnormality is detected in the sensor 20 or the actuator 21. The abnormality detection information is accumulated in the first memory 321.

When using the detection signals of the sensors 20 for the control, the calculation processing unit 33 refers to the abnormality detection information in the first memory 321 based on the program. The calculation processing unit 33 then confirms whether or not there is abnormality detection information containing the ID given to the sensor 20. Since the IDs are separately given to the duplexed sensors 20 and 20, the confirmation is made to both the IDs of the sensors 20 and 20.

If there is the abnormality detection information on the ID of the confirmation object in the first memory 321, the detection signals of the sensor 20 given the ID is not used for the control calculation, but the detection signals of the other sensor 20 being normal is used for the control calculation.

If abnormalities are detected in both the sensors 20 and 20, and there are pieces of abnormality detection information each containing the respective IDs, the detection signals of both the sensors 20 and 20 are not used for the control.

If abnormalities are detected in both the duplexed sensors 20 in a large number of sensors 20, the engine 11 can continued to be operated using default setting values. Under circumstances where it is however still difficult to continue the operation of the engines 11, a pilot is urged to stop the engine 11 by means of, for example, displaying a message or sounding an alarm. If the engine 11 is stopped, the flight can be continued by the remaining engine 11.

The case where abnormality is detected in the actuator 21 is dealt with as with the case of the sensor 20.

When activating the actuators 21 on the basis of the calculation result, the calculation processing unit 33 refers to the abnormality detection information in the first memory 321 based on the program. The calculation processing unit 33 then confirms whether or not there is abnormality detection information containing the ID given to the actuator 21 with respect to both the IDs of the duplexed actuators 21 and 21.

If there is the abnormality detection information on the ID of the confirmation object in the first memory 321, the actuator 21 given the ID is not operated, but the other normal actuator(s) 21 is operated, and if abnormalities are detected in both the actuators 21 and 21 and there are pieces of abnormality detection information each containing the respective IDs, both the actuators 21 and 21 are not operated.

The case where abnormalities are detected in both the duplexed actuators 21 in a large number of actuators 21 can be dealt with as with the case of the sensors 20.

Furthermore, abnormality detection information is typically stored in the first memory 321, read speed of which is faster than that of the ROM 320. This can increase the speed of the calculation processing, and can improve the responsiveness of the control.

The abnormality detection information is still stored in the first memory 321 regardless of the operating or the stopping of the engines 11, and is not erased (reset) from the first memory 321 even when the starting switch 16 is turned off. As with the abnormality detection information, the program read in the first memory 321 and the variety of calculated values are not erased from the first memory 321 even when the starting switch 16 is turned off.

As a result, the abnormality detection information will not be erased from the first memory 321 even if the pilot actively stops the engine 11 by turning off the starting switch 16, or the engine 11 is stopped due to, for example, a rainstorm blowing in the engine 11.

That is, as long as the power source of the FADEC 30 is tuned on when the engine 11 is stopped, the stored content is not cleared and the abnormality detection information is saved in the first memory 321.

Based on the abnormality detection information stored in the first memory 321, the calculation processing unit 33 thereby knows the sensor 20 or the actuator 21 in which any abnormality has been detected until the last operation of the engine finished, without waiting for abnormality to be detected again after the engine is started the next time.

According to the present embodiment, when abnormality is detected in the sensor 20 or the actuator 21, the engine 11 can be thereafter controlled using only the sensors 20 and the actuators 21 of reliability without using the sensor 20 or the actuator 21 in which the abnormality has been detected, on the basis of the abnormality detection information.

It is thereby possible to perform a stable and reliable engine control, without the possibility that the detection of a failure is delayed or the possibility that the engine 11 suddenly has a loss of function in the event that the engine 11 runs away out of control or that the engine breaks down.

As described above, if the abnormality detection information stored in the first memory is not erased when the engine 11 is stopped, it is possible to avoid using a sensor or an actuator having a low reliability on the basis of the abnormality detection information, while the FADEC 30 is energized, which allows for achieving the object of the present invention to improve the reliability of the control.

Maintenance of the sensor 20 and the actuator 21 can be conducted on the basis of abnormality detection information, while the power source of the FADEC 30 is not turned off and the first memory 321 for storing abnormality detection information is energized.

According to the present embodiment, since the data stored in the first memory 321 is not erased when the engine 11 is stopped, the engine 11 can be quickly restarted, which in turn contributes the stability of the flight.

Now, if the first memory 321 stores abnormality detection information, the engine 11 may not be restarted in the case where abnormality detection information is referred to based on the program when the engine 11 is started and it is determined whether to start the engine 11 on the basis of the abnormality detection information. However, in the present embodiment, erasing the abnormality detection information is not recommended in order to securely restart the engine 11 since the flight can continue with the remaining engine 11 even if failure of some engines 11 among the plurality of engines 11 occurs. The present embodiment puts emphasis on performing the control with high reliability using only the sensors 20 and the actuator 21 in which no abnormality is detected, rather than restarting the engine 11 in an insecure state.

Second Embodiment

Figure 3:
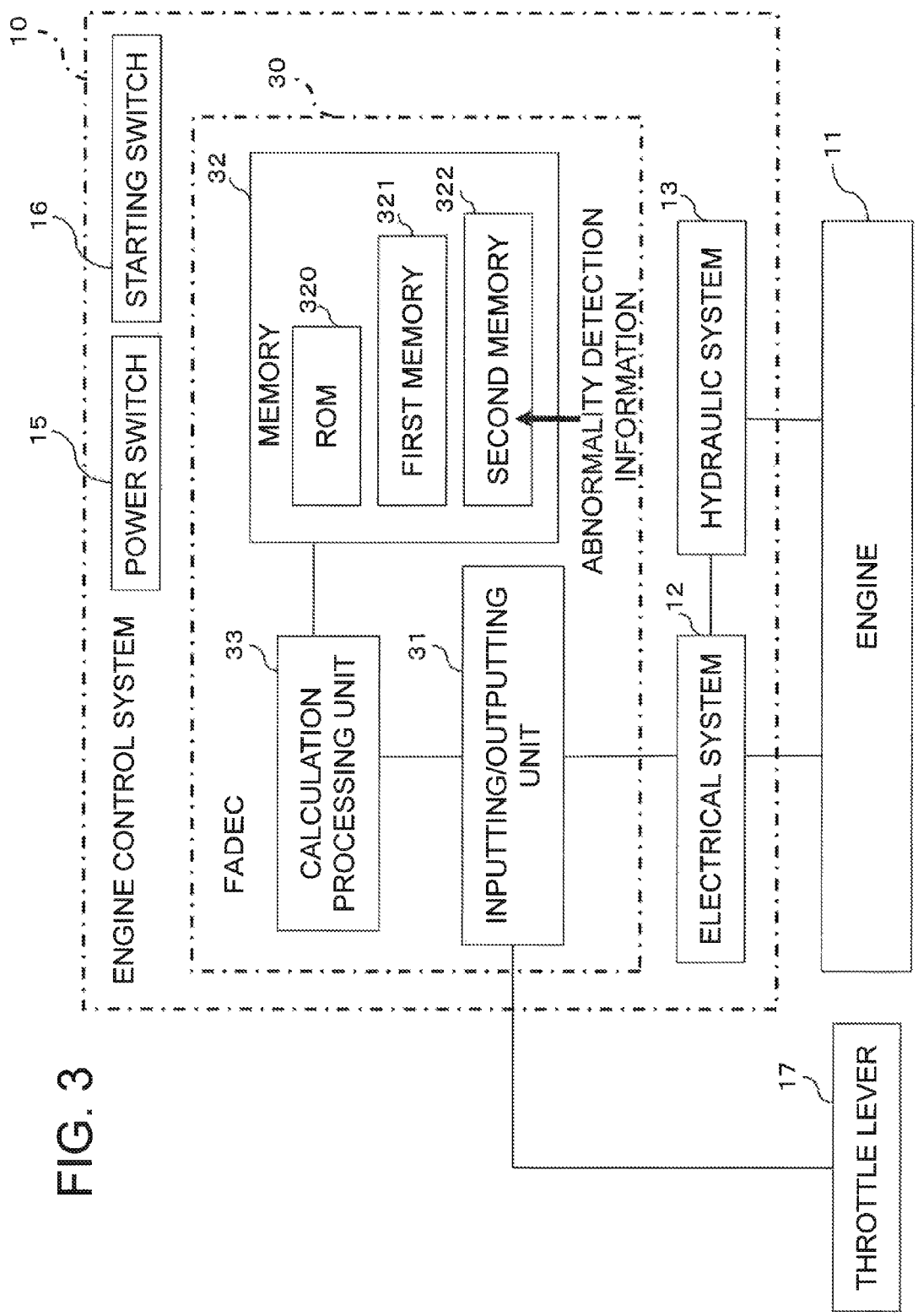
FIG. 3 is a block diagram showing a schematic configuration of a FADEC according to a second embodiment of the present invention installed in the aircraft.

A second embodiment of the present invention will be next described with reference to FIG. 3.

The second embodiment differs from the first embodiment in that abnormality detection information is not stored in the first memory 321 being volatile but stored in a second memory 322 being nonvolatile. Other points are similar to those of the first embodiment, and components similar to those of the first embodiment are denoted by the same reference numerals.

The FADEC 30 includes a ROM 320, a first memory 321 being volatile, and a second memory 322 being a nonvolatile storage such as EEPROM (Electrically Erasable Programmable Read-Only Memory).

As the second memory 322, storages which can retain data even if the energization thereto is shut off, can be used regardless of storage schemes, including semiconductor memories such as flash memories, FeRAMs (ferroelectric random access memories), PRAMs (Registered Trademark) (phase-change memories), RRAMs (Registered Trademark) (resistive rams), EEPROMs (Electrically Erasable Programmable Read-Only Memories), magnetic storages such as hard disks, and optical discs.

Since the second memory 322 is nonvolatile, abnormality detection information stored therein is not erased but still stored in the second memory 322 even after the energization to the second memory 322 is shut off with turning off the power source of the FADEC 30.

The abnormality detection information is not erased unless an erasing command for abnormality detection information prepared in the program is not executed.

As a result, when the FADEC 30 is started in the next flight, the calculation processing unit 33 is to know a sensor 20 and an actuator 21 in which the abnormality is detected, from the beginning of the start on the basis of abnormality detection information in the second memory 322.

That is, after the power source of the FADEC 30 is turned on, the sensor 20 or the actuator 21 in which the abnormality is detected can be grasped on the basis of the abnormality detection information in the second memory 322, without waiting for abnormality to be detected again with respect to the sensor 20 or the actuator 21 in which abnormality is detected up to the previous flight.

Thus, referring to the abnormality detection information makes it possible to avoid using a sensor 20 or an actuator 21 having a low reliability, in which the abnormality is detected, for the control. The engines 11 can be then controlled with only the sensors 20 and the actuator 21 in which no abnormality is detected, which in turn allows for improving the reliability of controlling the engines.

The abnormality detection information can be erased by operating the inputting device of the FADEC 30 or by operating a maintenance computer connected to the FADEC 30 after the maintenance of the sensor 20 or the actuator 21 in which the abnormality is detected is conducted on the basis of the abnormality detection information.

Before the abnormality detection information is erased from the second memory 322, the abnormality detection information can be read by the maintenance computer and saved in a nonvolatile memory of the maintenance computer as a history of abnormality detection information.

In each of the embodiments, abnormality detection information can be stored for only either the sensors 20 or the actuators 21.

In addition, abnormality detection information of devices other than the sensors 20 and the actuators 21 can be targeted.

In addition to abnormality detection information on a sensor 20 or an actuator 21, other information intended to be used for controlling the engines 11 or improving the control quality can be still stored in the storage.

For example, accumulating executed control commands for the FADEC 30 in the storage can help improve the control quality through analyzing the data content in the storage.

The configurations of the engine control system 10 described in the above embodiments are merely one example, and a variety of modifications are allowed.

In addition, the present invention can be applied not only to the engine control system 10 including the FADEC 30, but also to a control system for storing, while controlling devices (control objects) included in an aircraft, abnormality detection information on devices such as sensors used for the control.

The control system can be configured in a variety of forms in conformity with control objects, and part of or the whole of the hydraulic system may be absent.

In the control system, using a nonvolatile storage for storing abnormality detection information allows abnormality detection information not to be erased when the energization to the storage is shut off. Thus, referring to the abnormality detection information makes it possible to avoid using a device such as a sensor in which abnormality is detected, for the control.

In addition, even in the case where a nonvolatile storage is not used, it is possible to avoid using a device such as a sensor in which any abnormality is detected at starting the control object the next time, for the control, as long as the power source of the control computer is on and the memory is not reset when operation of the control object is stopped.

Apart from the above, the configuration described in the aforementioned embodiment may be chosen or changed to other configurations as appropriate without departing from the gist of the present invention.

What is claimed is:

1. A control system for controlling an engine of an aircraft, the control system comprising a full authority digital engine control ("FADEC") including a calculation processing unit for performing control calculation, and a storage for storing abnormality detection information that indicates a detected abnormality in a device used for an engine control, the abnormality being detected by the calculation processing unit, wherein the abnormality detection information is not erased but still stored in the storage even if the engine is stopped, as long as a power source of the FADEC is on.

2. The control system according to claim 1, wherein the storage has volatility.

3. The control system according to claim 1, wherein
the storage has nonvolatility, and
the abnormality detection information is not erased but still stored even if the power source of the FADEC is turned off and the energization to the storage is shut off.

4. The control system according to claim 1, wherein the control system comprises a sensor and an actuator as the device used for the engine control,
a detection signal of the sensor is used for the control calculation; and
the actuator is operated on the basis of results of the control calculation, wherein
abnormality detection information on at least one of the sensor and the actuator is stored in the storage.

5. The control system according to claim 1, wherein
the FADEC further comprises an inputting/outputting unit that communicates with a core system for controlling an operation or a flight of the aircraft.

6. The control system according to claim 4, wherein
the FADEC further comprises an inputting/outputting unit that communicates with a core system for controlling an operation or a flight of the aircraft, and
the inputting/outputting unit receives a detection signal from the sensor, and outputs a control signal to a driving circuit for the actuator.

7. An aircraft comprising the control system according to claim 1.

* * * * *